United States Patent
Choi

(10) Patent No.: US 11,938,889 B2
(45) Date of Patent: Mar. 26, 2024

(54) AIR BAG

(71) Applicant: HYUNDAI MOBIS CO., LTD., Seoul (KR)

(72) Inventor: Jung Geun Choi, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 5 days.

(21) Appl. No.: 17/811,025

(22) Filed: Jul. 6, 2022

(65) Prior Publication Data

US 2023/0075554 A1    Mar. 9, 2023

(30) Foreign Application Priority Data

Sep. 9, 2021    (KR) .................. 10-2021-0120220

(51) Int. Cl.
| | |
|---|---|
| B60R 21/237 | (2006.01) |
| B60R 21/203 | (2006.01) |
| B60R 21/231 | (2011.01) |

(52) U.S. Cl.
CPC .......... *B60R 21/237* (2013.01); *B60R 21/203* (2013.01); *B60R 21/231* (2013.01)

(58) Field of Classification Search
CPC .... B60R 21/237; B60R 21/231; B60R 21/203
See application file for complete search history.

(56) References Cited

U.S. PATENT DOCUMENTS

2018/0056923 A1* 3/2018 Kang ................. B60R 21/2338

FOREIGN PATENT DOCUMENTS

| JP | 2001138848 A | * | 5/2001 | |
|---|---|---|---|---|
| JP | 2018203213 A | * | 12/2018 | ........... B60R 21/203 |
| JP | 2019018790 A | * | 2/2019 | |
| KR | 2019-0115793 | | 10/2019 | |
| WO | WO-2018131180 A1 | * | 7/2018 | ........... B60R 21/203 |

OTHER PUBLICATIONS

English Language Abstract of KR 2019-0115793 published Oct. 14, 2019.

* cited by examiner

*Primary Examiner* — Keith J Frisby
(74) *Attorney, Agent, or Firm* — DLA Piper LLP (US)

(57) ABSTRACT

An air bag is configured to be miniaturized by a foldable structure of an air bag cushion in a driver seat and to safely protect a driver by enlarging a protection area thereof, and the air bag includes a first folded part configured to be folded in a vertical direction of an air bag cushion, and wherein the first folded part is unfolded in deployment to increase a vertical length of the air bag cushion, and a second folded part configured to be folded in leftward and rightward directions of the air bag cushion, and wherein the second folded part is unfolded in deployment to increase a transverse length of the air bag cushion.

6 Claims, 5 Drawing Sheets ately in the art.
AIR BAG

CROSS REFERENCE TO RELATED APPLICATION

The present application claims priority to Korean Patent Application No. 10-2021-0120220, filed Sep. 9, 2021, the entire contents of which is incorporated herein for all purposes by this reference.

BACKGROUND OF THE DISCLOSURE

Field of the Disclosure

The present disclosure relates to an air bag configured to be miniaturized by a foldable structure of an air bag cushion in a driver seat and to safely protect a driver by enlarging a protection area thereof.

Description of the Related Art

An air bag absorbs a shock applied to an occupant with proper inflation of an air bag cushion in a collision accident of a vehicle to reduce or prevent injuries, and inflating operation of the air bag cushion serves as an important role in ensuring the safety of the occupant.

However, with an increase in spread of autonomous vehicles and electric vehicles, the tendency to slim the design of a driver seat air bag and to reduce the package thereof is clearly revealed.

Therefore, in order to miniaturize the air bag, it is necessary to miniaturize the air bag cushion.

However, when the air bag cushion is miniaturized, the reduction in the protection area for a driver is inevitable due to the reduction in the volume of the air bag cushion, and thus a problem of causing head/neck injuries to the driver occurs.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art, and the present disclosure is intended to provide an air bag, the air bag being configured to be miniaturized by a foldable structure of an air bag cushion in a driver seat and to safely protect a driver by enlarging a protection area thereof.

In order to achieve the above objective, according to one aspect of the present disclosure, there is provided an air bag including: a first folded part configured to be folded in a vertical direction of an air bag cushion, and wherein the first folded part may be unfolded in deployment to increase a vertical length of the air bag cushion; and a second folded part configured to be folded in leftward and rightward directions of the air bag cushion, and wherein the second folded part may be unfolded in deployment to increase a transverse length of the air bag cushion.

The first folded part has an upper portion of which a volume may be expanded larger than a volume of a lower portion thereof in deployment of the air bag cushion.

The first folded part may be folded to an upper portion of the air bag cushion; and the second folded part may be folded to both left and right portions of the air bag cushion.

The first folded part may be configured to be folded several times in a zigzag shape.

The first folded part and the second folded part may be folded by being overlapped with each other in an intersecting shape.

The air bag cushion may include a front panel and a rear panel that may be overlapped with each other; and the first folded part and the second folded part may be configured to be folded to the front panel.

When the first folded part and the second folded part are folded, the front panel and the rear panel may have the same size; and the front panel and the rear panel may be sewn along edges thereof.

As described above, according to the present disclosure, the air bag cushion is packed inside the steering wheel while the first folded part and the second folded part are folded to the air bag cushion. Accordingly, there is an advantage in that the air bag cushion is miniaturized to realize an effect of reducing a package of the air bag cushion.

Furthermore, in operating the air bag, the first folded part and the second folded part are deployed while being unfolded, so that the vertical and transverse lengths of the air bag cushion are increased, and an area where a driver can be protected is enlarged with an increase in the vertical and transverse volumes of the air bag cushion, so that there are advantages in that the collision performance is improved and occupants are prevented from being injured.

DETAILED DESCRIPTION

Figure 1:
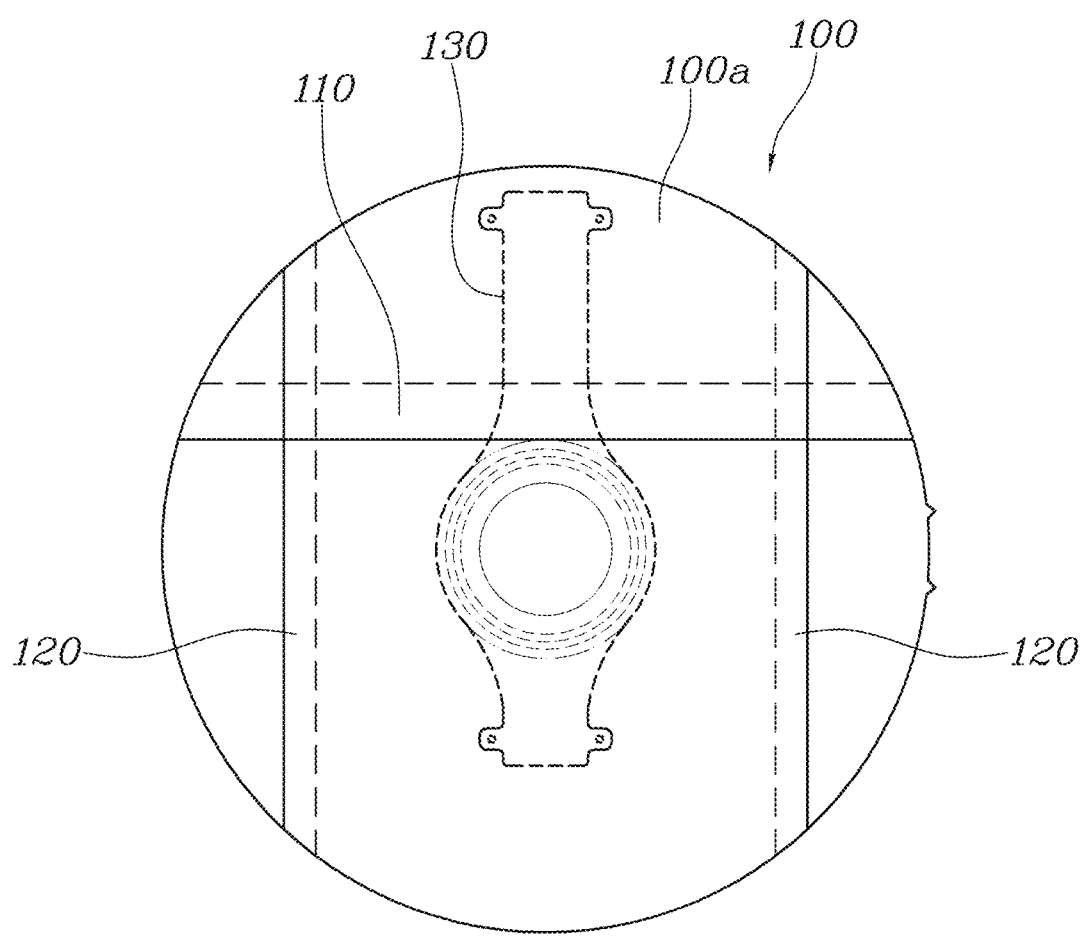
FIG. 1 is a view showing a first folded part and a second folded part that are folded to a front panel of an air bag cushion according to the present disclosure.

In the following description, the structural or functional description specified to exemplary embodiments according to the concept of the present disclosure is intended to describe the exemplary embodiments, so it should be understood that the present disclosure may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present disclosure are not limited to the embodiments which will be described hereinbelow with reference to the accompanying drawings, but all of modifications, equivalents, and substitutions are included in the scope and spirit of the disclosure.

It will be understood that, although the terms first and/or second, etc. may be used herein to describe various elements, these elements should not be limited by these terms.

These terms are only used to distinguish one element, from another element. For instance, a first element discussed below could be termed a second element without departing from the teachings of the present disclosure. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent", or "directly adjacent" should be interpreted in the same manner as those described above.

The terminology used herein is for the purpose of describing particular embodiments only and is not intended to limit the present disclosure. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present disclosure belongs. It must be understood that the terms defined by the dictionary are identical with the meanings within the context of the related art, and they should not be ideally or excessively formally defined unless the context clearly dictates otherwise.

Meanwhile, an exemplary embodiment of the present disclosure will be described in detail with reference to the accompanying drawings.

According to the present disclosure, an air bag may be mounted to a driver seat, and when a collision signal is input in a state where the air bag is mounted into a steering wheel, an inflator explodes to supply gas into an air bag cushion 100.

Accordingly, the air bag cushion 100 inflates and deploys toward a driver in a shape of covering the steering wheel, thereby protecting the driver from an impact due to a collision accident.

Meanwhile, FIG. 1 is a view showing a first folded part 110 and a second folded part 120 that are folded to a front panel 100a of the air bag cushion 100 according to the present disclosure.

Referring to the drawing, the air bag according to the present disclosure includes: the first folded part 110 folded in a vertical direction of the air bag cushion 100, wherein the first folded part is unfolded in deployment to increase a vertical length of the air bag cushion 100; and the second folded part 120 folded in leftward and rightward directions of the air bag cushion, wherein the second folded part is unfolded in deployment to increase a transverse length of the air bag cushion.

In other words, while the air bag cushion 100 is packed inside the steering wheel, a part of the air bag cushion 100 is folded in the leftward and rightward directions and the vertical direction.

In the above state, when the air bag cushion 100 is deployed, a folded part is deployed while being unfolded, and as the first folded part 110 folded in the vertical is unfolded, the vertical length of the air bag cushion 100 is increased, thus expanding a vertical volume of the air bag cushion 100, and at the same time, as the second folded part 120 is unfolded in the leftward and rightward directions, the transverse length of the air bag cushion 100 is increased, thus expanding the transverse volume of the air bag cushion 100.

Therefore, the air bag cushion 100 is normally mounted into the steering wheel while being folded therein, so that an effect of reducing a package of the air bag cushion due to miniaturization of the air bag cushion 100 is realized. When the air bag is operated, as the air bag cushion 100 is expanded in vertical and transverse volumes, a protection area of the air bag for the driver is enlarged to improve the collision performance and to prevent occupants from being injured.

In addition, as shown in FIG. 1, the first folded part 110 has an upper portion of which the volume inflates larger than the volume of a lower portion thereof in deployment of the air bag cushion 100.

Therefore, the first folded part 110 is folded to an upper portion of the air bag cushion 100; and the second folded part 120 is folded to left and right portions of the air bag cushion 100.

In other words, in a state before the air bag cushion 100 is deployed, based on the center of the air bag cushion 100, the first folded part 110 is folded to the upper portion of the air bag cushion 100, but not to a lower portion thereof. Therefore, the first folded part 110 is unfolded at the upper portion when the air bag is operated, so that the upper volume of the air bag cushion 100 is deployed larger than the lower volume.

Therefore, in a collision accident, the driver's body is quickly hit by the air bag cushion 100 and the hitting time is reduced, so that the driver can be safely protected.

Moreover, according to the present disclosure, the first folded part 110 may be folded several times in a zigzag shape.

Figure 3:
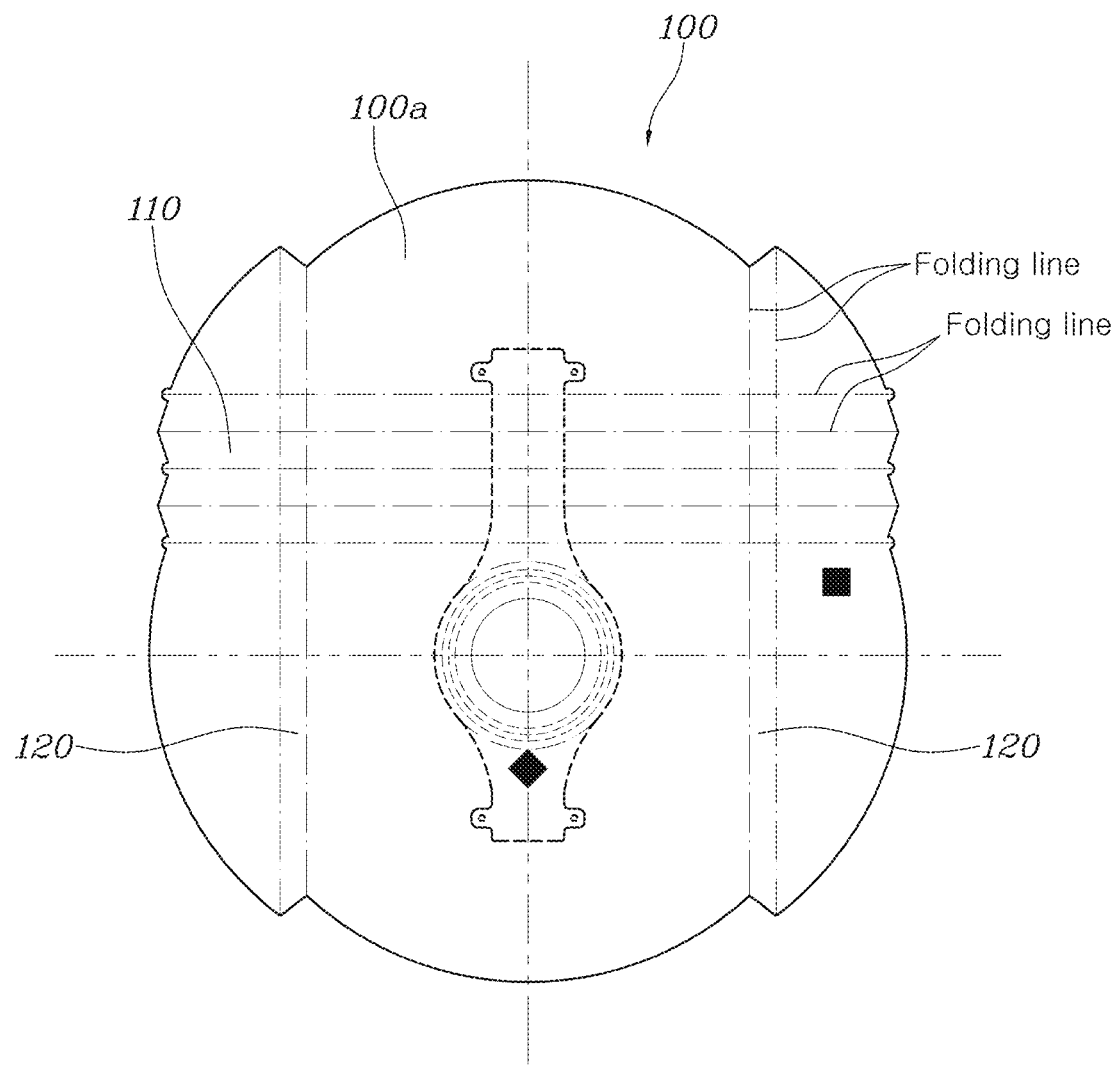
FIG. 3 is a view showing the first folded part and the second folded part according to the present disclosure, and the first folded part and the second folded part are unfolded.

In other words, FIG. 3 is a view showing the first folded part 110 and the second folded part 120 according to the present disclosure in the folded state, and the first folded part 110 is folded several times, at least two times, at the upper portion of the air bag cushion 100.

Therefore, when the air bag cushion 100 is deployed, the air bag cushion 100 is deployed with extending the vertical length thereof by a folded length of the first folded part 110. The air bag cushion 100 is deployed in a vertically long ellipse shape so that the upper volume of the air bag cushion 100 is more increased. The driver's body is quickly hit by the air bag cushion 100 by the expanded upper volume of the air bag cushion 100, thereby safely protecting the driver.

Meanwhile, referring to FIG. 1, the air bag of the present disclosure is folded such that the first folded part 110 and the second folded part 120 are overlapped with each other in an intersecting shape.

For example, after the second folded part 120 is folded in the leftward and rightward directions at the left and right portions of the air bag cushion 100, the first folded part 110 is folded in the vertical direction at the upper portion of the air bag cushion 100, and the first folded part 110 is folded in a shape of being overlapped perpendicular to the second folded part 120.

Therefore, the first folded part 110 and the second folded part 120 are folded at a location close to the center portion of the air bag cushion 100, and thus folded lengths of the first folded part 110 and the second folded part 120 are increased. Therefore, the volume of the air bag cushion 100 inflating vertically and transversely is increased and the protection area for the driver is enlarged.

In addition, the air bag cushion 100 according to the present disclosure is configured such that the front panel 100a and a rear panel 100b are overlapped with each other; and the first folded part 110 and the second folded part 120 are folded to the front panel 100a.

In other words, as the first folded part 110 and the second folded part 120 are folded to the front panel 100a, when the air bag cushion 100 is deployed, the transverse length and the vertical length of the front panel 100a are increased.

Therefore, the length of the front panel 100a on which the driver is hit is increased, so that the protection area of the air bag cushion 100 is enlarged and the occupants are prevented from being injured.

Figure 2:
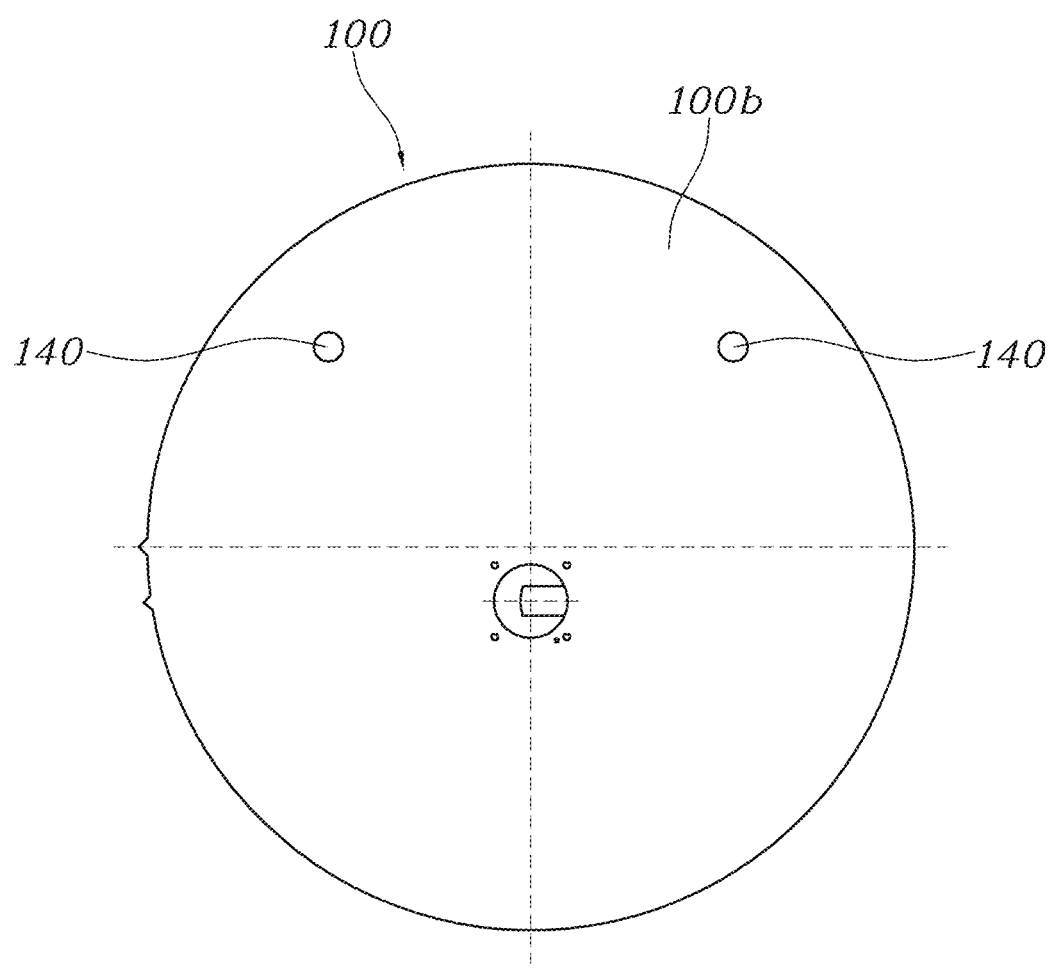
FIG. 2 is a view showing a rear panel of the air bag cushion according to the present disclosure.

For example, FIG. 2 is a view showing the rear panel 100b of the air bag cushion 100 according to the present disclosure, and the rear panel 100b is formed in a circular plate shape. The rear panel 100b has a vent hole 140 to discharge gas filled in the air bag cushion 100 after the driver is hit by the air bag cushion 100, thereby safely restricting the driver.

Figure 4:
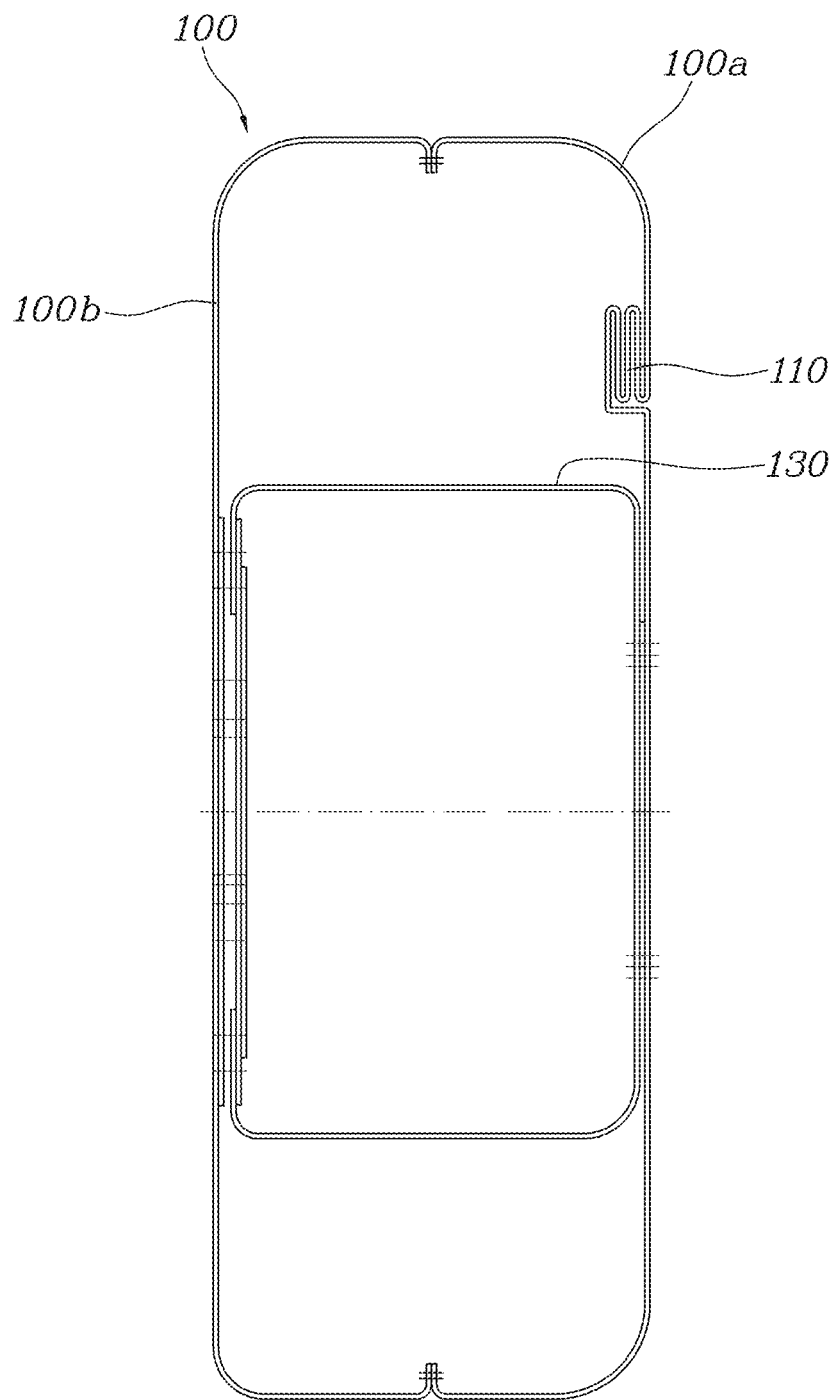
FIG. 4 is a side sectional view showing the first folded part of the air bag cushion according to the present disclosure, and the first folded part is in a state before unfolding.
Figure 5:
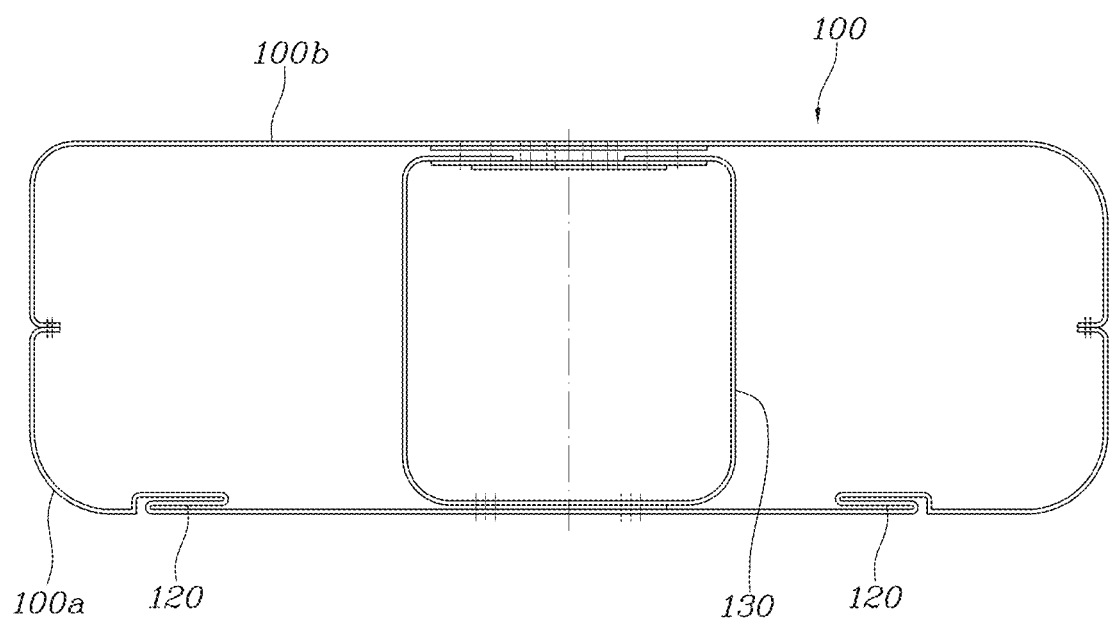
FIG. 5 is a plan sectional view showing the second folded part of the air bag cushion according to the present disclosure, and the second folded part is in a state before unfolding.

FIG. 4 is a side sectional view showing the first folded part 110 of the air bag cushion 100 according to the present disclosure, and the first folded part 110 is in a state before unfolding. FIG. 5 is a plan sectional view showing the second folded part 120 of the air bag cushion according to the present disclosure, and the second folded part is in a state before unfolding.

Referring to FIGS. 4 and 5, while the first folded part 110 and the second folded part 120 are folded, the front panel 100a and the rear panel 100b has the same size; and the front panel 100a and the rear panel 100b are sewn along edges thereof.

In other words, the front panel 100a to which the first folded part 110 and the second folded part 120 are folded is packed with having the same size as the size of the rear panel 100b, so that the effect of reducing the package of the air bag cushion 100 due to miniaturization thereof is realized.

For reference, the front panel 100a and the rear panel 100b are connected to each other by a tether 130, thereby limiting the unfolding shape of the air bag cushion 100.

As described above, the air bag cushion 100 according to the present disclosure is packed inside the steering wheel while the first folded part 110 and the second folded part 120 are folded to the air bag cushion 100, so that the effect of reducing the package of the air bag cushion is realized due to miniaturization of the air bag cushion 100. When the air bag is operated, the first folded part 110 and the second folded part 120 are unfolded and deployed, and the vertical and transverse lengths of the air bag cushion 100 are increased, so that the protection area for the driver is enlarged due to an increase in the vertical and transverse volume of the air bag cushion 100 and the collision performance is improved and the occupants are prevented from being injured.

Although the preferred embodiment of the present disclosure has been disclosed in detail only with respect to the above specific embodiments, those skilled in the art will appreciate that various modifications, additions, and substitutions are possible, without departing from the spirit and scope of the present disclosure, and it is appropriate that the various modifications, additions, and substitutions belong to the accompanying claims.

What is claimed is:

1. An air bag comprising:
a first folded part configured to be folded into a first number of folds in a vertical direction of an air bag cushion and unfolded during deployment to increase a vertical length of the air bag cushion; and
a second folded part configured to be folded into a second number of folds in leftward and rightward directions of the air bag cushion and unfolded during deployment to increase a transverse length of the air bag cushion, the first number of folds being greater than the second number of folds,
wherein the first folded part has an upper portion having a volume that is expanded larger than a volume of a lower portion of the first folded part during deployment of the air bag cushion, and in a state before the air bag cushion is deployed, based on a center of the air bag cushion, the first folded part is configured to be folded to an upper portion of the air bag cushion, but not to a lower portion of the air bag cushion.

2. The air bag of claim 1, wherein the second folded part is folded to both left and right portions of the air bag cushion.

3. The air bag of claim 1, wherein the first folded part is configured to be folded into the first number of folds in a zigzag shape.

4. The air bag of claim 1, wherein the first folded part and the second folded part are folded overlapping each other in an intersecting shape.

5. The air bag of claim 1, wherein the air bag cushion comprises a front panel and a rear panel that are overlapped; and
the first folded part and the second folded part are configured to be folded to the front panel.

6. The air bag of claim 5, wherein when the first folded part and the second folded part are folded, the front panel and the rear panel have a same size; and
the front panel and the rear panel are sewn along edges thereof.

* * * * *